United States Patent [19]

Bosnyak et al.

[11] 4,355,150

[45] Oct. 19, 1982

[54] THERMOPLASTIC POLY(BISPHENOL A TERE- OR ISOPHTHALATE) COPOLYCARBONATE

[75] Inventors: Clive P. Bosnyak, Selly Oak; Robert N. Haward, Harborne; Ian W. Parsons, Selly Oak, all of England

[73] Assignee: The Secretary of State for Defence in Her Britannic Majesty's Government of the United Kingdom of Great Britain and Northern Ireland, London, England

[21] Appl. No.: 169,211

[22] Filed: Jul. 15, 1980

[30] Foreign Application Priority Data

Jul. 18, 1979 [GB] United Kingdom ................ 7925845

[51] Int. Cl.³ .............................................. C08G 63/64
[52] U.S. Cl. .................................... 528/176; 528/179; 528/182; 528/194; 528/496; 524/605; 524/611
[58] Field of Search ................................ 528/176, 194

[56] References Cited

U.S. PATENT DOCUMENTS 3,169,121  2/1965  Goldberg ............................ 528/176
4,156,069  5/1979  Prevorsek et al. .................. 528/176
4,260,731  4/1981  Mori et al. .......................... 528/194

OTHER PUBLICATIONS

English Language Translation of Japanese Kokai 77-78999.

Primary Examiner—Harold D. Anderson
Attorney, Agent, or Firm—Cushman, Darby & Cushman

[57] ABSTRACT

A thermoplastic polymeric material comprises a copolymer which is a poly(bisphenol A tere- and/or isophthalate) copolycarbonate having a molar ratio of phthalate to carbonate units in the inclusive range from 2 to 10, preferably 3 to 8. The material, which may be prepared by techniques which are known, may be used in applications for high temperature transparent thermoplastics, eg transparencies for the aerospace industry.

4 Claims, 3 Drawing Figures

THERMOPLASTIC POLY(BISPHENOL A TERE- OR ISOPHTHALATE) COPOLYCARBONATE

The present invention relates to thermoplastic polymeric materials.

Thermoplastic polymeric materials are used in a wide range of applications nowadays. One of the applications where they are being used increasingly in place of conventional materials, namely inorganic glasses, is as transparent structures, eg aircraft transparencies.

There are a number of desirable properties which a transparent structural material should possess, particularly if it is to be considered for use in more specialised applications, eg in the aerospace industry. For example, it should possess a yield stress which is high: the yield stress is the point or region on its stress versus strain curve up to which the material extends uniformly with applied stress and undergoes reversible or elastic deformation. It should show minimal 'necking': this is the formation of a constriction or neck in its shape when the material extends substantially without a significant increase in stress to give a plastic deformation and is indicated by the extent of drop in the stress v strain curve beyond the yield stress. It also should have (amongst other things) a high glass transition temperature Tg, a high decomposition temperature and a good chemical resistivity. It should retain its (Young's) modulus, ie the modulus should not vary appreciably, over a wide range of temperature.

For convenience the following abbreviations are used in this specification and appended claims:

| LIST OF ABBREVIATIONS | |
|---|---|
| PBAI | = poly(bisphenol A isophthalate) |
| PBPAT | = poly(bisphenol A terephthalate) |
| PBAI/T | = copolymer of bisphenol A isophthalate and bisphenol A terephthalate |
| PBPAI/TC | = poly[(bisphenol A isophthalate/terephthalate) carbonate] |
| BPA | = bisphenol A |
| BPAT | = bisphenol A terephthalate |
| HO(BPAT)$_n$OH | = di-hydroxy-terminated poly(bisphenol A terephthalate) |

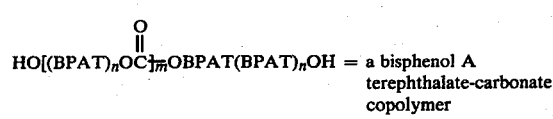

HO[(BPAT)$_n$OC]$_m$OBPAT(BPAT)$_n$OH = a bisphenol A terephthalate-carbonate copolymer

| | |
|---|---|
| TCE | = 1,1,2,2 tetrachloroethane |
| TPC | = teraphthaloyl chloride |
| IC | = isophthaloyl chloride |
| DSC | = differential scanning calorimetry |
| VPO | = vapour pressure osmometry |
| Tg | = glass transition temperature |
| IV | = inherent viscosity |
| Mn | = number average molecular weight |
| NMR | = nuclear magnetic resonance spectroscopy |
| LVN | = limiting viscosity number |
| w/v | = weight/volume |
| IR | = infra red |
| UV | = ultra violet |
| C | = concentration |
| $\eta$ | = viscosity of polymer solution |
| $\eta_0$ | = viscosity of solvent |
| MPa | = mega Pascals |
| GPa | = giga Pascals |
| °K. | = degrees Kelvin |
| °C. | = degrees centigrade |
| dlg$^{-1}$ | = decilitres per gram |
| dm$^3$ | = cubic decimeter |
| OLS | = Offenlegungsschrifft |

| LIST OF ABBREVIATIONS | |
|---|---|
| In BS 2782 1970 301K BS | = British Standard |

Copolyesters containing bisphenol A (ie 2,2 bis(4 hydroxyphenyl)propane) and terephthalate, isophthalate and carbonate groups are already known and have been proposed for use as transparent structural materials. Polymers falling within this general field do however include a very wide range of possible chemical structures. A number of the possible compositions have already been described in the Patent and Scientific literature using melt, solution or interfacial techniques eg Jap. Kokai Nos. 76-145593, 77-45,692; 77-109,591; Germ. Pat. No. 2,714,544, U.S. Pat. Nos. 4,156,069 and 3,169,121.

However, it has now been found, unexpectedly, that if the molar ratio of phthalate-to-carbonate units in such copolymers is selected from a special range or compositional region, some of the desirable properties of these materials are enhanced or maximised.

According to the present invention in a first aspect of thermoplastic material comprises a copolymer which is a poly(bisphenol A tere- or iso-phthalate) copolycarbonate having a molar ratio of phthalate-to-carbonate units in the inclusive range 2 to 10. Such material will hereinafter be referred to as the 'basic copolymer' (or 'basic copolymers' as appropriate). Preferably the ratio is between 3 and 8.

For instance, in the specified range, copolymers embodying the invention show a good yield stress, an enhanced or maximum glass transition temperature, a high decomposition temperature and reduced necking and retain an almost constant value of modulus at a fairly high level over a wide temperature range. They show also a high optical transmissivity (the last feature being shown also in other compositional regions). This makes the material according to the invention particularly attractive for use in relatively high strength, high temperature applications for windows and other transparent coverings, eg in the aerospace industry.

These materials may be compression moulded at temperatures above Tg eg at Tg +50° C. and are suitable for conventional thermoplastic processing at higher temperatures.

The copolymers may be produced by reacting bisphenol A (BPA) in excess with isophthaloyl or terephthaloyl chloride, which are herein referred to generally as an appropriate benzene dicarboxylic acid chloride, and then adding phosgene to introduce the carbonate units. Alternatively they may be produced by known melt polymerisation or interfacial techniques.

In another procedure, especially suitable for experimental work the initial polyester block, eg a dihydroxy-terminated BPA terephthalate may be separated and then condensed with phosgene (or with diphenyl carbonate in a melt process) in a second stage. In this case the phthalate:carbonate ratios will be largely determined by the number average molecular weight (Mn) of the original polyester block. In its turn, Mn may be estimated by conventional analysis (eg by reaction with benzoyl chloride) or by vapour pressure osmometry.

When produced from the benzene dicarboxylic acid chloride and phosgene as indicated above the molecular weight of the whole copolymer may be conventionally regulated by the introduction of monofunctional units such as p-cresol or a monofunctional acid chloride before or during phosgenation and by allowing phosgenation to proceed to completion.

Conventional additives such as antioxidants, uv (ultraviolet) stabilisers or other heat stabilisers, in total less than about 5% by weight, may also be added, to improve ageing and processing stability.

A reaction scheme for the preparation of bisphenol A terephthalate-carbonate copolymers from terephthaloyl chloride by the method indicated above is given below as follows:

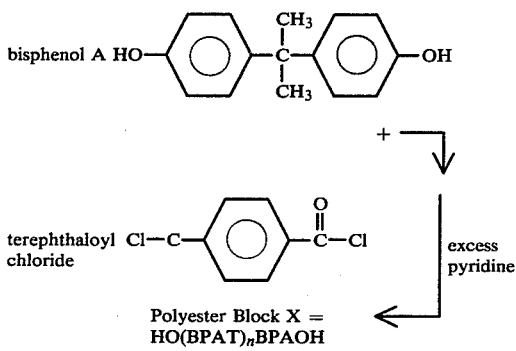

BPA=bisphenol A, BPAT=bisphenol A terephthalate, n is 2–10 or preferably 3–8.
Then

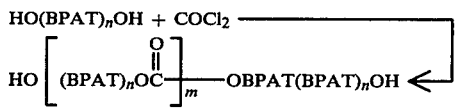

where m is normally >5 so that the ratio of terephthalate:carbonate groups ∼n.

This ratio may of course be independently determined by IR analysis as described below.

Naturally, the molecular weight of the final copolymer is proportional to m times n. Thus varying n by varying the starting ratio of bisphenol A to terephthaloyl chloride varies the number of BPAT units to each carbonate unit in the final copolymer. Residual hydroxy groups may be removed by reaction with a monofunctional reagent eg an acid chloride.

In any particular system m should preferably be sufficiently high to give a limiting viscosity number (LVN) for the final copolymer in 1,1,2,2 tetrachloroethane (TCE) solution at 25° C. not less than about 0.6 dl/g to enable the copolymer to extend beyond the yield strain (as described in Experiments below). The LVN is obtained by measuring the inherent viscosity (IV) at concentrations below 1.0% w/v, TCE at 25° C., eg 0.5% w/v, and extrapolating to infinite dilution. The IV, as is well known to those skilled in the art, is given by $IV = 1/C \log_e (\eta/\eta_o)$ where C is the concentration and $\eta$ and $\eta_o$ are the viscosities of the solvent, in this case TCE, with and without the copolymer added. At low concentrations, eg 0.5% w/v TCE, IV≃LVN for the final copolymer.

Polybisphenol A isophthalate copolycarbonates may be prepared in an analogous way from isophthaloyl chloride.

According to the present invention in a second aspect a thermoplastic material comprises a copolymer of:
 a. poly (bisphenol A terephthalate) copolycarbonate and
 b. poly (bisphenol A isophthalate) copolycarbonate
the molar ratio of the phthalate-to-carbonate units being in the inclusive range 2 to 10, preferably in the inclusive range 3 to 8. Thus, in this case the copolymer contains both isophthalate and terephthalate units. Thus, the second aspect of the invention is a special example of the first aspect of the invention.

The molar ratio of isophthalate-to-terephthalate units in copolymers of the second aspect depends on the properties required of the material. In general terms isophthalate-rich copolymers embodying the second aspect of the present invention formed into a film neck more easily than terephthalate-rich ones although isophthalate-rich copolymers are more flexible than terephthalate-rich ones. If the molar isophthalate:terephthalate ratio is about 50:50 then a compromise is obtained between the greater necking tendency on the one hand and the greater flexibility on the other hand.

Preferably, although not essentially, the terephthalate:isophthalate molar ratio is between 0.67 and 4.0 (ie between 40% and 80% terephthalate) inclusive.

The thermoplastic material of the second aspect of the present invention may be used in the same applications as the basic copolymers as described above.

Materials embodying the second aspect of the present invention are preferably prepared by making an intermediate copolymer of bisphenol A isophthalate and bisphenol A terephthalate having a molar terephthalate:isophthalate ratio equal to that required in the final product and then forming the copolycarbonate of that copolymer. Preparation of the intermediate copolyester may be similar to that for production of the corresponding bisphenol A terephthalate or isophthalate (ie using excess pyridine) as described above and preparation of the final product from the intermediate copolyester may be similar to that for production of the basic copolymers from the corresponding polyesters as described above (ie using phosgene).

Embodiments of the present invention will now be described by way of example with reference to the accompanying drawings, in which.

Figure 1:
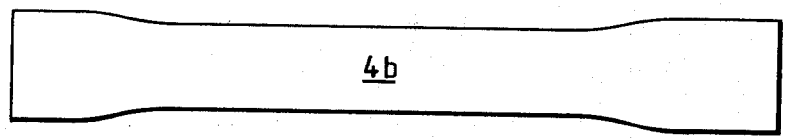
FIG. 1 is a sketch showing necking formation in films embodying the invention.
Figure 1:
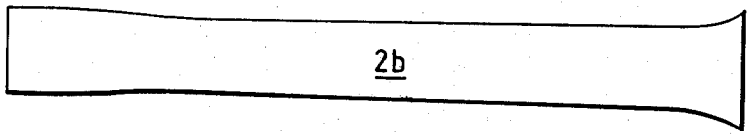

In the following:

| | |
|---|---|
| PBPAI | = poly (bisphenol A isophthalate) |
| PBPAT | = poly (bisphenol A terephthalate) |
| PBPAI/T | = copolymer of bisphenol A isophthalate and bisphenol A terephthalate |
| PBPAI/TC | = poly[(bisphenol A isophthalate/terephthalate) carbonate] |
| TCE | = 1,1,2,2 tetrachloroethane |
| DSC | = differential scanning calorimetry |
| VPO | = vapour pressure osmometry |
| Tg | = glass transition temperature |
| IV | = inherent viscosity |
| $\overline{Mn}$ | = average molecular weight |
| NMR | = nuclear magnetic resonance spectroscopy |
| LVN | = limiting viscosity number |
| w/v | = weight/volume |

Examples will now be given of the preparations and properties of copolymers embodying the invention. Examples 1 to 6 and Experiments 1 to 6 deal with bisphenol A terephthalate copolycarbonates. Example 7 and Experiments 7 and 8 deal with bisphenol A isophthalate copolycarbonates. Examples 8 to 11 and Experiments 9 to 12 deal with bisphenol A terephthalate/isophthalate copolycarbonates.

EXAMPLE 1

All materials used in this Example were maintained extensively free from water. 47.6 g of BPA was dissolved in 500 cm$^3$ of TCE at a temperature of between 25° C. and 60° C. To this solution was added 25 g of pyridine which is an excess needed for reaction. An excess of pyridine >100% should be avoided as it leads to a lower overall molecular weight polymer. 33.9 g of TPC was dissolved in 150 cm$^3$ of TCE at room temperature and this solution was slowly added to the BPA/TCE solution under an inert atmosphere of nitrogen. The temperature was raised to 60°–100° C. and maintained at this level. The reaction was allowed to proceed to completion with continuous stirring. Phosgene was then slowly bubbled into the solution at between 10° C. and 30° C. until the inherent viscosity IV (~LVN in this case), roughly measured by diluting a sample of the reaction mixture with TCE, was greater than 0.7 dl/g (0.5% w/v solution at 25° C.).

The resultant copolymer was precipitated from the solution by addition to the solution of an excess of warm methanol with rapid stirring. The white fibrous precipitate was further washed in 50/50 w/v methanol-2 N HCl mixture to remove pyridine. It was then further washed with methanol and distilled water until free from Cl$^-$ ions. Finally the precipitate was dried in vacuo at 60° to 100° C. until constant weight was achieved. The yield was ~95%.

The LVN of the product was measured as 0.9 dl/g.

VPO analysis of the polyester before phosgenation gave $\overline{M}n$ as 1820. Thus the terephthalate-to-carbonate ratio is 4.5. The copolymer composition was further confirmed by measurement of the ratio of the infrared absorbance of the carbonate group at 1770 cm$^{-1}$ to the absorbance of the ester linkage at 1740 cm$^{-1}$, and by NMR.

EXAMPLE 2

A similar procedure to Example 1 was followed except that the weights of BPA and TPC in the starting materials were 48.1 g and 32.1 g respectively.

(A) A product was obtained by extensive phosgenation with a LVN of 2.15 dl/g and a terephthalate-carbonate ratio of 3.7.

(B) Using the same phosgenation procedure as in the other case (A) in this Example but not continuing so long, a product was obtained with a LVN of 0.8 dl/g, for comparison with the other material.

Subsequent measurement showed that the higher viscosity (molecular weight) material has a higher Tg and a lower yield stress than the 0.8 dl/g material. In both cases there was virtually zero fall in engineering stress yield (see Experiments 1, 2 and 4 below).

EXAMPLE 3

A similar procedure to Example 1 was followed except that the weights of BPA and TPC in the starting materials were 22.2 and 16.9 g respectively.

The product had a LVN of 1.06 dl/g and a terephthalate-to-carbonate molar ratio of 5.6.

EXAMPLE 4

A similar procedure to Example 1 was followed except that the weights of BPA and TPC in the starting materials were 55.1 and 42.9 g.

The product had a LVN of 0.97 dl/g and a terephthalate-to-carbonate molar ratio of 8.3.

EXAMPLE 5

A similar procedure to Example 1 was followed except that the weights of BPA and TPC in the starting materials were 39.1 and 32.5 g respectively.

The product had a LVN of 0.94 dl/g and a terephthalate-to-carbonate molar ratio of 8.8.

EXAMPLE 6 (for comparison purposes)

A similar procedure to Example 1 was followed except that the weights of BPA and TPC in the starting materials were 79.9 and 33.9 g respectively.

The product had a LVN of 1.02 dl/g and a terephthalate-to-carbonate ratio of 1.55.

Products obtained in Examples 1 to 6 were each converted into the form of a film by casting from a 10% TCE/90% CHCl$_3$ solution and drying at 70°–80° C. under vacuum. They were then further tested in the following experiments:

EXPERIMENT 1

The average yield stress and average percentage elongation at breaking of each film were measured using a dumb-bell shaped film specimen BS.2782 1970 301 K type on an Instron Floor Model TT-BM (Trade Mark) Tensile Tester at 22° C.±1° at about 50% humidity using a pulling rate of 0.05 cm/min. The following results were obtained:

TABLE 1
YIELD STRESS AND ELONGATION TO BREAK

| Sample number | Ester: Carbonate molar ratio | Average yield stress (MPa) | Percentage elongation to break |
|---|---|---|---|
| 1 | 1.8 | 42.5 | 70 |
| 2 | 3.7 | 43.9 | 60 |
| 3 | 4.5 | 50.1 | 110 |
| 4 | 5.6 | 52.0 | 119 |
| 5 | 8.3 | 43.3 | 128 |

In this Experiment Samples 1 and 5 showed necking, Sample 4 showed diffuse necking and Samples 2 and 3 showed no necking (extended uniformly) at stresses above the yield stress.

EXPERIMENT 2

The same procedure as in Experiment 1 was followed except that some of the samples were first further dried for three days in a vacuum at 100° C. The following results were obtained:

TABLE 2
YIELD STRESS AND ELONGATION BREAK

| Sample number | Terephthalate Carbonate/Ratio | LVN | Yield Stress (MPa) |
|---|---|---|---|
| 1b | 1.8 | 1.02 | 56 |
| 2b | 3.7 | 0.8 | 58 |
| 3b | 4.5 | 0.88 | 56.5 |
| 4b | 5.6 | 1.06 | 56.0 |

During the tensile test, the samples 1b and 4b showed a definite neck formation, although the definition and sharpness of the neck was less than that for polycarbonate. The drop in engineering stress after yield was only 2–3%. With sample 2b there was no observable drop in engineering stress and the neck formed, if any, was hardly observable. With sample 3b there was a 1–2% drop in engineering stress and again the neck was very diffuse. Sketches taken from photographs of the films showing the deformation process are given in FIGS. 1(a) and (b) where the difference in necking behaviour between samples 4b (FIG. 1(a)) and 2b (FIG. 1(b)) is illustrated. Prior art materials would in general neck more easily than both of these samples.

The lower drop in engineering stress with the consequent reduced tendency to the localisation of plastic deformation is a significant advantage for the copolymers embodying the present invention.

EXPERIMENT 3

The dynamic moduli of the films were measured (typically around 3 GPa) at various temperatures and found to decline only slightly between −40° and +150° C.

EXPERIMENT 4

The glass transition temperatures of the films were measured during a Perkin Elmer DSC2 (Trade Mark) calorimeter, and extrapolated to zero weight (Polymer 17 (1976) 51).

TABLE 3

| GLASS TRANSITION TEMPERATURES | | |
|---|---|---|
| Sample number | Ester: Carbonate ratio | Glass transition temperature (°K.) |
| 1 | 1.8 | 475 |
| 2 | 3.7 | 485 (LVN = 0.8) |
| | | 505 (LVN = 2.15) |
| 3 | 4.5 | 490 |
| 4 | 5.6 | 500 |
| 5 | 8.3 | 495 |
| (BPA polycarbonate grade 5705) | 0 | 440 (LVN = 0.73) |
| (pure PBPAT) | | 475 |

Figure 2:
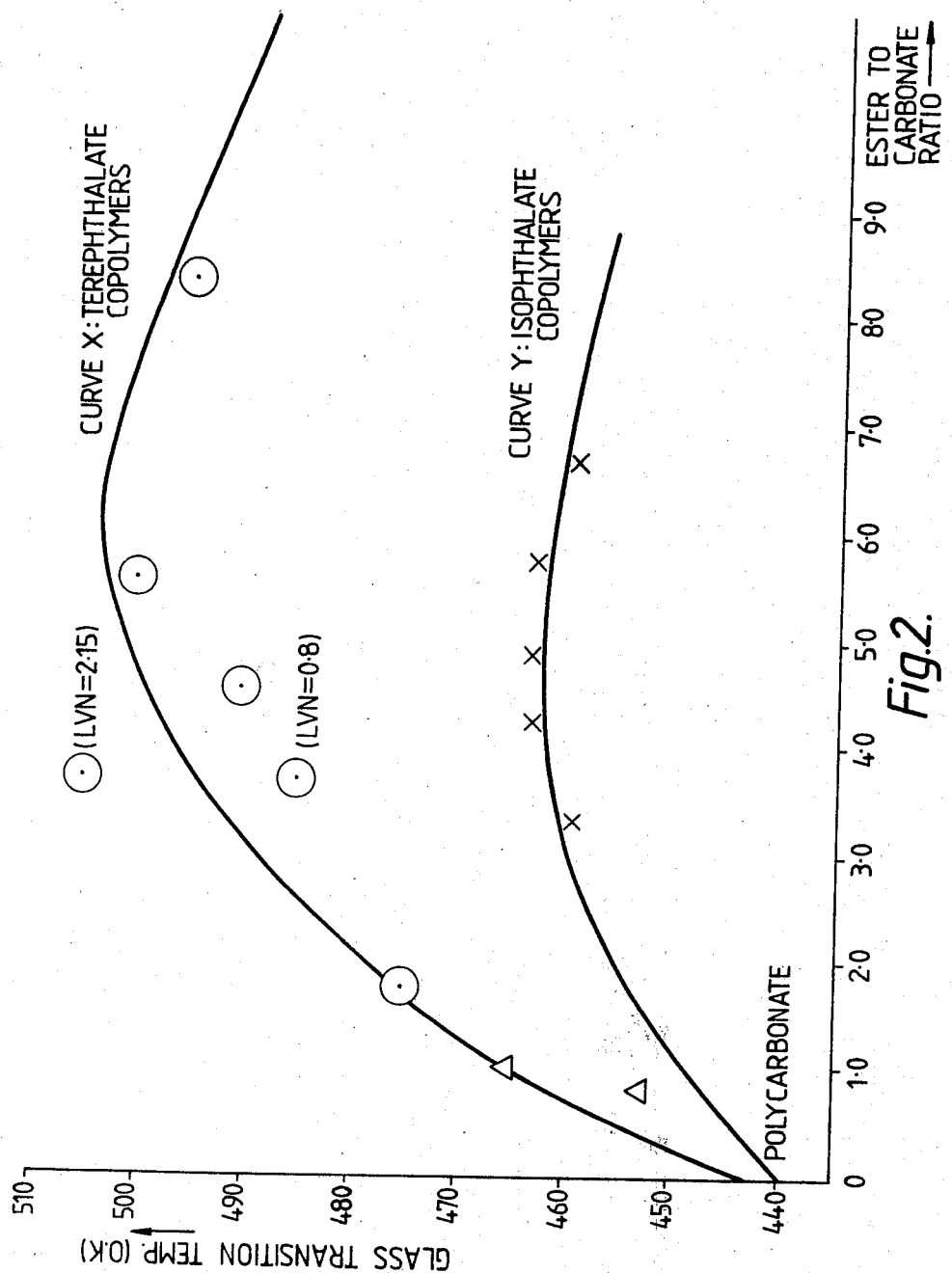
FIG. 2 is a graph of glass transition temperature against ester-carbonate ratio for materials embodying the invention.

These values of Tg are plotted in FIG. 2 curve X (points marked by circles) where it will be seen that the low values of Tg, reported in German OLS No. 2,714,544 and U.S. Pat. No. 4,156,069 (points marked by triangles) compare unfavourably with the copolymers embodying the invention.

EXPERIMENT 5

The heat stability of the films was measured first in air using a Dupont 951 (Trade Mark) Thermogravimetric Analyser coupled to a Dupont 990 (Trade Mark) Thermal Analyser. The following results were obtained.

The temperature for initial degradation (10% weight loss in the range 380°–440° C.) showed a tendency to increase with the content of the terephthalate. There was a significant maximum in the temperature for 50% weight loss with the Sample No. 3.

In a nitrogen atmosphere decomposition temperatures were about 70° C. higher than those in air.

EXPERIMENT 6

The transmission spectrum of the films in the visible and ultra-violet spectral regions was measured and found to be featureless with only a small amount of scattering.

EXAMPLE 7

Copolymers of poly(bisphenol A isophthalate) and polycarbonate were produced by a procedure analogous to Example 1 above but using isophthaloyl chloride, IC, instead of terephthaloyl chloride, TPC, as a starting material.

EXPERIMENT 7

The following products obtained as fibrous precipitates from the polymerisation process of Example 7 had their LVN (in dl/g at 25° C. in TCE), and Tg measured (as for the terephthalate products).

TABLE 4

| | (see also FIG. 2) | | |
|---|---|---|---|
| Sample number | Isophthalate/CO$_3$ ratio | Tg ± 2° C. | LVN |
| 7 | 3.3 | 459 | 1.17 |
| 8 | 4.2 | 463 | 0.92 |
| 9 | 4.9 | 463 | 0.88 |
| 10 | 6.0 | 463 | 0.81 |
| 11 | 6.7 | 459 | 0.81 |
| pure PBPAI | | 450 | |

The value of Tg, which rise to a maximum inside the region where the ester:carbonate ratio is between 2 and 10, are shown in FIG. 2, curve Y, and can be contrasted with the lower value of 440° K. for pure polycarbonate.

EXPERIMENT 8

The yield stress of films of the isophthalate products made in Example 7 which had subsequently been (i) cast from CHCl$_3$, and (ii) moulded at 250° C. and cooled rapidly, were measured (as for the terephthalate products above) and the results are given in Tables 5 and 6 respectively, as follows:

TABLE 5

| YIELD STRESS OF FILMS CAST FROM CHCl$_3$ | | |
|---|---|---|
| Sample number | Isophthalate/CO$_3$ ratio | Yield Stress MPa |
| 7 | 3.3 | 57 |
| 8 | 4.2 | 57.5 |
| 9 | 4.9 | 58.8 |
| 10 | 6.0 | 62.2 |
| 11 | 6.7 | 59.2 |

TABLE 6

| YIELD STRESS OF MATERIALS MOULDED at 250° C. AND COOLED RAPIDLY | | | |
|---|---|---|---|
| Sample number | Isophthalate/CO$_3$ | LVN | Yield Stress MPa |
| 7C | 3.3 | 1.0 | 54.4 |
| 8C | 4.2 | 0.9 | 55.8 |
| 9C | 4.9 | 0.85 | 56.2 |
| 10C | 6.0 | 0.8 | 57.3 |
| 11C | 6.7 | 0.8 | 56.7 |

The results of Experiments 7 and 8 presented in Tables 4–6 indicate that copolycarbonates of BPA isophthalate also show an improvement in some of the properties desired of a transparent thermoplastics material in the ester-carbonate molar ratio region between 2 and 10 as compared with ester-carbonate molar ratios of less than 2 known in the prior art.

EXAMPLE 8

Preparation of a PBPAI/T having a terephthalate to isophthalate molar ratio of 50:50 and a subsequent PBPAI/TC having that molar ratio STEP A8: The production of the appropriate PBPAI/T.

REAGENTS

| | | |
|---|---|---|
| Purified | Bisphenol A (BPA) | 60 g (0.263 moles) |
| | Terephthaloyl Chloride (TPC) | 20.85 g |
| | Isophthaloyl Chloride (IC) | 20.85 g |
| | Pyridine | 36.0 g (0.22 moles) |
| | 1,1,2,2 Tetrachloroethane (TCE) | 700 cm$^3$ |
| | Methanol | 5 dm$^3$ |
| | 2N.HCl | 1 dm$^3$ |

METHOD

Bisphenol A was dissolved in TCE (500 cm$^3$) and pyridine (36 g) at 60° C. The TPC and IC were dissolved in TCE (200 cm$^3$) in a dry box. The TPC/IC solution was slowly added to the BPA solution under N$_2$ with stirring and kept at 60° C. for 8 hours. (The reaction was considered essentially complete after 2 to 3 hours.) The clear, colourless solution obtained was poured into 2 dm$^3$ methanol to precipitate the required white polyester. Further washings with 2 N.HCl/methanol (2 dm$^3$) followed by methanol were made to obtain a TCE-pyridine free polyester. Final drying is in vacuo (60°–70° C.) to constant weight. The yield was measured as 71 g and the LVN (TCE, 25° C.) as 0.146 dl g$^{-1}$. $\overline{M}n$ was measured as 2420 by VPO, and the molar percentage by weight of terephthalate was measured as 51%±3% by NMR.

STEP B8: The production of the PBPAI/TC.

REAGENTS

PBPAI/T=40 g
Pyridine=5 g
Phosgene=1.7 g
TCE=650 cm$^3$
p-Cresol=0.5 g
Methanol=5 dm$^3$
2 N HCl=1 dm$^3$

METHOD

The PBPAI/T (prepared as in Step A8), previously dried, was dissolved in TCE at 20°–35° C., under N$_2$. Pyridine was added, then phosgene was slowly added until the required inherent viscosity measured on an aliquot, was reached. p-Cresol (0.5 g) was then added and phosgene readmitted until a faint yellow colour was perceived, indicating an excess of phosgene. The solution was stirred for a further hour then methanol (10 cm$^3$) was added to destroy residual phosgene. Precipitation and washing were as for the polyester in Step A8. A white fibrous precipitate was obtained.

The yield was measured as 39.3 g. The LVN (TCE 25° C.) was measured as 0.832 dl g$^{-1}$. The ester:carbonate ratio was 6.2.

EXPERIMENT 9

The properties of the product of Example 8

The white powder was easily compression moulded at 270° C. for one minute to produce clear, transparent plaques. The LVN was 0.81 dl g$^{-1}$ and the density 1.2075 g cm$^{-3}$. The Tg was found by DSC to be 191° C. (464° K.), and the amorphous material showed no tendency to recrystallise at 5, or 10° min$^{-1}$ above the Tg up to 430° C.

Tensile tests carried out as for the basic terephthalate and isophthalate copolymers as in Experiment 1 above showed that the product of Example 8 necks but exhibits no stress-whitening after yield. The engineering yield stress was measured as 56.5 MPa, the strain as 14% and the ultimate extension as 67%.

EXAMPLE 9

Preparation of a PBPAI/T having an isophthalate:terephthalate molar ratio of 25:75 and a subsequent PBPAI/TC having that molar ratio STEP A9: The production of the appropriate PBPAI/T.

The method was as in Step A8 except that in this case the quantities were: BPA (57.1 g) TPC (30 g), IC (10 g), and pyridine (34 g).

The obtained yield of polyester PBPAI/T was 58 g (70%). The LVN (25° C., TCE) was measured as ∼0.17 dl g$^{-1}$. The value of $\overline{M}n$ was measured as 2340 by VPO.

STEP B9: The production of the PBPAI/TC.

The method was as in Step B8 except that in this case 40 g of the PBPAI/T prepared in Step A9 was used. The yield was measured as 39.4 g and the LVN (TCE, 25° C.) was measured as 1.024 dl g$^{-1}$. The ester:carbonate ratio was 5.9.

EXPERIMENT 10

The properties of the product of Example 9

The white powder was easily compression moulded at 270° C. for one minute to produce a clear transparent plaque. The LVN was 0.94 dl g$^{-1}$ and the density 1.208 g cm$^{-3}$. The glass transition temperature Tg (DSC) was 212° C. and the amorphous material showed no tendency to recrystallise at 5° or 10° min$^{-1}$ above the Tg up to 430° C.

Tensile tests (carried out as in Experiment 1 above) showed that the polymer has an engineering yield stress of 52.8 MPa, strain 16% and an ultimate extension of 32%. The fall in engineering stress after yield was measured as 1.5% which was only just sufficient to enable the polymer to neck diffusely. No stress-whitening after yield was observed.

EXAMPLE 10

Preparation of a random block PBPAI/TC

PBPAI and PBPAT were made separately using a similar method to that described in Step A8. These esters had molecular weights $\overline{M}n$ of 1810 and 1960 respectively. 20 g of the PBPAT and 20 g of the PBPAI were then dissolved in TCE (500 cm$^3$), and pyridine (3 g) at 30° C. then phosgene were added until the LVN (0.5% w/v) was 1.20 dl g$^{-1}$. Methanol was then added and the product was precipitated, washed and dried as in Step A8.

The yield was measured as 39.6 g. The LVN (TCE, 25° C.) was measured as 1.143 dl g$^{-1}$. The ester:carbonate ratio was 4.7.

EXPERIMENT 11

The properties of the product of Example 10

The white powder product obtained in Example 10 was easily compression moulded at 270° C. for one minute to produce a clear transparent plaque. The LVN was measured as 1.1 dl g$^{-1}$ and the density as 1.2075 g cm$^{-3}$. The Tg (DSC) was measured as 197° C. (470° K.) and the amorphous material showed no tendency to recrystallise (as in the cases of Experiments 9 and 10).

Tensile tests carried out as in the Experiment 1 above showed that the polymer has an engineering yield stress of 54 MPa, strain 13%, and an ultimate extension of 58%. The fall in engineering stress after yield was measured as 5% which was concurrent with the formation of a stable neck. Again no stress-whitening was observed.

EXAMPLE 11

Preparation of a PBPAI/T having a molar terephthalate:isophthalate ratio of 25:75 and a subsequent PBPAI/TC having that molar ratio STEP A11: The production of the appropriate PBPAI/T.

The method of synthesis was as in Step A8 above except that in this case the following quantities of the reagents BPA, TPC and IC were used:

BPA—54.5 g; TPC—9.4 g; and IC—28.2 g.

The yield of the polyester PBPAI/T was measured as 59.9 g (76%). The LVN (25° C., TCE) was measured as 0.1325 dl g$^{-1}$. The molar percentage of terephthalate was measured as 27±3% by NMR. $\overline{M}n$ was measured as 2420 by VPO.

STEP B11

This Step was the same as Step B8 except that in this case 40 g of the PBPAI/T prepared in Step A11 were used. The yield was 39.4 g. The LVN was measured (25° C., TCE) as 1.19 dl g$^{-1}$. The ester:carbonate ratio was 6.2.

EXPERIMENT 12

Properties of the product of Example 11

The white powder product was easily compression moulded at 260° C. for one minute to produce a clear, transparent plaque. The LVN was 1.04 dl g$^{-1}$. The value of Tg was found by DSC to be 193° C. and the amorphous material showed no tendency to recrystallise at heating rates of 5° or 10° min$^{-1}$ above the Tg up to 430° C.

Tensile tests carried out as in Experiment 1. It was found that the polymer has an engineering yield stress of 54.7 MPa, strain 12% and ultimate extension of 57%. The fall in engineering stress after yield was 7% which was concurrent with the formation of a stable neck. Again no stress-whitening was observed up to fracture.

We claim:

1. A thermoplastic composition comprising a copolymer which is a poly (bisphenol A tere-or iso-phthalate) copolycarbonate having a molar ratio of phthalate-to-carbonate units in the inclusive range of from 2 to 10.

2. A composition as claimed in claim 1 having a molar ratio of phthalate-to-carbonate units in the inclusive range of from 3 to 8.

3. A composition as claimed in claim 1 wherein said copolymer has a limiting viscosity number of at least 0.6 dl/g in 1, 1, 2, 2 tetrachloroethane at 25° C.

4. A composition as claimed in claim 1 which has been compression moulded at a temperature above its glass transition temperature to the form of a transparent structure.

* * * * *